Nov. 25, 1952     K. FELLROTH     2,618,997
ANTIFRICTION PRESSURE STOP FOR LATHES AND THE LIKE
Filed Feb. 5, 1951
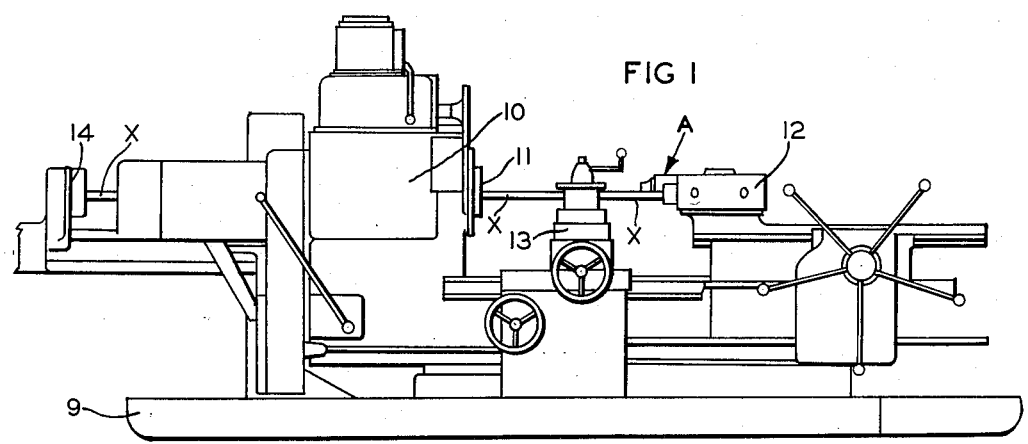
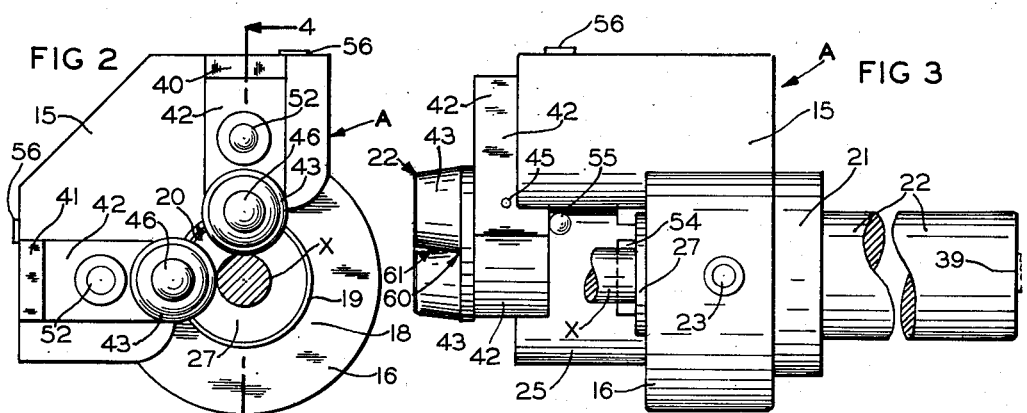
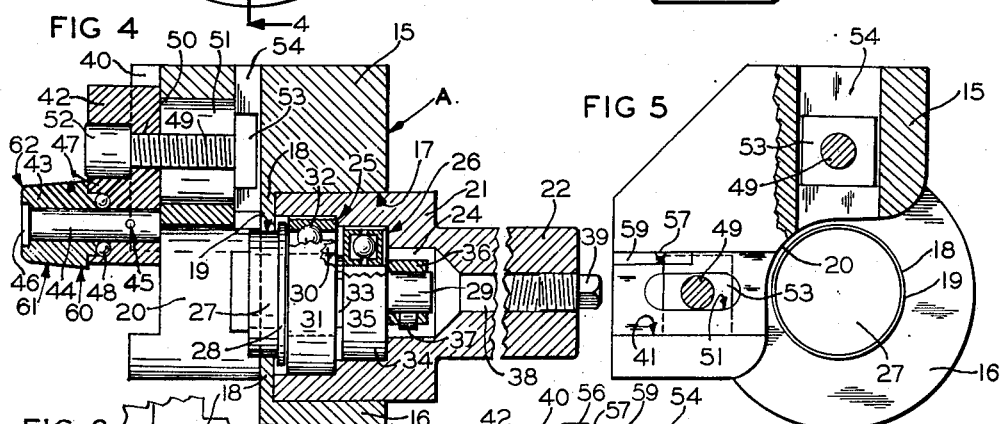
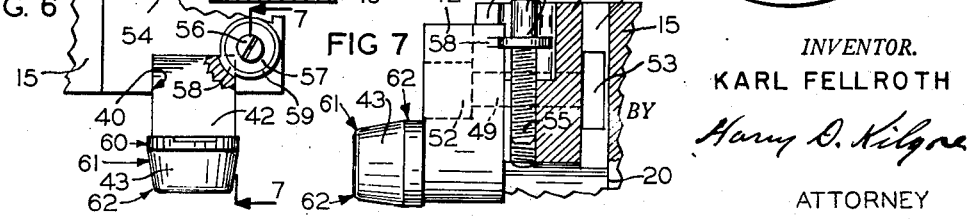
*INVENTOR.*
KARL FELLROTH
BY Harry D. Kilgore
ATTORNEY Patented Nov. 25, 1952

2,618,997

UNITED STATES PATENT OFFICE 2,618,997

ANTIFRICTION PRESSURE STOP FOR LATHES AND THE LIKE

Karl Fellroth, Minneapolis, Minn.

Application February 5, 1951, Serial No. 209,422

2 Claims. (Cl. 82—33)

My present invention relates to an attachment for lathes, screw machines and the like in the form of an anti-friction pressure stop for lathes and the like.

It is well known that in ordinary shop practice, when a bar stock projects beyond a certain distance from a chuck or a collet holding the same with its inner end impinging an adjustable stop, that determines the length of a section of the bar to be machined, the bar stock starts to wobble, and when the pressure of a cutting tool, either for surface turning or form tool work, is put against the bar stock, it will chatter and jump and thus make it impossible to do accurate work. Therefore, it becomes necessary to do the turning close to the chuck or collet. At the completion of the turning of the end portion of the bar stock adjacent the chuck or collet, the compound is adjusted to a position in which a cutting tool held thereby is a predetermined distance from the stop and the respective end section of the bar cut-off. The cut-off end section of the bar is next turned end for end and placed in the chuck or collet, after the bar stock held in the chuck or collet has been retracted. Next, the stop is adjusted into engagement with the outer end of the cut-off section of the bar, and, finally, the cut-off section of the bar adjacent to the chuck or collet is machined and thereafter removed from the chuck or collet. It will thus be seen that a large number of adjustments must be made for each section of the bar stock machined and cut off, which consumes a large amount of time and possible error in making an adjustment.

One of the principal objects of this invention is to provide a tool having a novel rotatable bar stock stop and an anti-friction assembly therefor.

A further object of this invention is to provide novel rollers, associated with the bar stock stop, for positioning and holding a bar stock concentric to the projected axis of the bar stop and for preventing the bar stock from being forced out of true by the pressure of a cutting tool thereagainst, whereby a bar stock may be successively endwise positioned for duplicate sections of a determined length, completely machined and cut off without changing the adjustment or position of the bar stock stop or the stop of the cut-off tool.

Other objects of the invention will be apparent from the following description, reference being had to the drawing.

To the above end, generally stated, the invention consists of the novel devices and combination of devices hereinafter described and defined in the claims.

In the accompanying drawing, which illustrates the invention, like characters indicate like parts throughout the several views.

Referring to the drawing:

Fig. 1 is a front elevational view of a turret lathe having my improved tool attached thereto;

Fig. 2 is a front elevational view of the improved tool, full size;

Fig. 3 is a right-side elevational view of the same;

Fig. 4 is a view principally in section taken on the line 4—4 of Fig. 2;

Fig. 5 is a view partly in front elevation and partly in transverse vertical section;

Fig. 6 is a fragmentary detail view in plan; and

Fig. 7 is a fragmentary detail view partly in side elevation and partly in section taken on the irregular line 7—7 of Fig. 6.

For the purpose of showing my improved tool applied in working position, there is shown in Fig. 1 of the drawing a turret lathe indicated as an entirety by the numeral 9 with the exception of the headstock 10, the collet 11, the turret 12, the compound 13 and the bar stock feed 14.

Referring now in detail to the improved tool A, the numeral 15 indicates a horizontally disposed body member. This body member 15 has on its right-hand side and bottom an integral semi-cylindrical lateral extension 16. The backs of the body member 15 and its extension are flat and flush. The body extension 16 is only substantially one-half as long as the body member 15. Both fronts of the body member 15 and its extension 16 are flat and parallel to the backs thereof. The perimeter of the top and the left-hand side of the body member 15 is a section of a hexagon having its axis coincident with the axis of the body extension 16.

Extending axially into the body member 15 and its extension 16, from the backs thereof, is a bore 17 of large diameter. This bore 17 extends to an internal annular flange 18 at the front of the body extension 16. The passageway through the flange 18 is designated by the numeral 19. The under side of the body member 15 is transversely concave, as indicated at 20, to afford clearance forwardly of the body extension 16 to the passageway 19.

A cylindrical head 21 on the outer end of a cylindrical shank 22 extends into the bore 17 from the back of the tool A with a tight fit. This head 21, at its front end, impinges the inner side of the flange 18 as a stop, and the rear end portion of said head extends materially rearwardly of the tool A. A set-screw 23 having a socket head has threaded engagement with the body extension 16, impinges the head 21 and holds the same in the bore 17. Within the head 21 is a cylinder 24 of different diameters to afford an outer annular stop shoulder 25 and an inner annular stop shoulder 26 of a smaller diameter.

A rotatable disk-like stop 27 in the cylinder 24 extends outwardly through the passageway 19 with a working fit and has on its inner end an annular external stop bead 28. This bead 28 is on the inner side of the flange 18 and prevents outward movement of the stop 27 through the passageway 19. Integral with the inner end of the stop 27, in axial alignment therewith, is a cylindrical shank 29, the axis of which is coincident with the axis of the cylinder 24.

A radial ball bearing 30 supports the shank 29 and hence the stop 27 in the cylinder 24 for free rotation in the head 21. The inner ball race 31 of the bearing 30 is tightly fitted on the shank 29 and against the inner end of the stop 27. The outer ball race 32 of the bearing 30 is tightly fitted in the cylinder 24 and held between the shoulder 25 and the bead 28. The shank 29, rearwardly of the bearing 30, is reduced in diameter to afford a shoulder 33 and a thrust ball bearing 34 is mounted on this reduced portion of the shank 29. The bearing 34 is held between the shoulders 26 and 33 and the shoulder 26 affords a base of resistance against pressure on the stop 27 and transmitted through said stop, the shank 29 and the thrust bearing 34 to the shoulder 26 on the head 21. The shank 29 rearwardly of the thrust bearing 34 is further reduced in diameter to afford a shoulder 35. A stop collar 36 on the reduced rear end portion of the shank 29 engages the shoulder 35 and holds the ball bearing assembly on the shank 29 when removed from the head 21. A set-screw 37 having threaded engagement with the collar 36 impinges the shank 29 and holds said collar on the shank 29.

Extending axially through the shank 22 from its outer end to the cylinder 24 is an oil duct 38 for supplying oil to the ball bearing assembly and the stop 27. A screw plug 39 normally closes the outer end of the duct 38.

In the front of the body member 15 is a vertical way 40 above the stop 27 and a horizontal way 41 at the left of said stop. Each way 40—41 is a wide shallow channel. A roller slide 42 is mounted in each way 40—41 and a roller 43 is mounted on the inner end portion of each of said slides. Each roller 43 is journaled on a shaft 44 which, at its inner end portion, extends into a transverse hole in the slide 42, projects outwardly thereof and is secured to said slide by a pin 45. Heads 46 on the outer ends of the shafts 44 are countersunk in the outer ends of the rollers 43 and hold the same against removal from the shafts 44. On the inner end of each roller 43 is a cylindrical extension 47 of reduced diameter and journaled in the respective slide 42. The transverse center of the way 40 and the axis of the respective roller 43 are on a vertical line radiating from the center of the stop 27 and the transverse center of the way 41 and the axis of the respective roller 43 are on a horizontal line radiating from the center of said stop. The axis of the shafts 44 and hence the coincident axes of the rollers 43 are parallel to the axis of the stop 27 and its shank 29. Ball bearings 48 are interposed between the inner ends of the cylindrical extensions 47 and the body member 15.

The slides 42 are each locked in the respective way 40—41, where adjusted, by a screw 49 that extends through a transverse hole 50 in said slide and a slot 51 in the head 15 that extends longitudinally of the respective way 40—41 at the transverse center thereof. The screws 49 have heads 52 countersunk in the faces of the slides 42 and said screws each has at its inner end portion screw-threaded engagement with a square nut 53 in a long passageway 54 in the body member 15. The passageways 54 are rectangular in cross-section, directly back of the ways 40—41 and parallel thereto, and extend completely through the body member 15. The nuts 53 have a sliding working fit in the passageways 54 and are held thereby from turning. Obviously, when the screws 49 are tightened, they frictionally clamp the slides onto the bottoms of the ways 40—41 and hold the same where adjusted in said ways.

Each slide 42 is moved endwise in the way 40—41 to adjust its roller 43 toward or from the projected axis of the stop 27 and its shank 29 by an adjusting screw 55. This adjusting screw 55 is at one side of the slide 42 and back of the same and has threaded engagement with the body member 15. On the adjusting screw 55, at the inner end of its head 56 is an annular lock flange 57 that extends into a lock notch 58 in the slide 42 and thus separably connects the adjusting screw 55 to said slide. The head 56 and the lock flange 57 work in a deep hole in the body member 15. The screw head 56 has a nick for a screw driver by means of which the screw 55 may be turned.

Referring again to the rollers 43, it is important to note that the inner end portion of each roller 43 has a constant diameter or, in other words, the periphery of the roller is transversely parallel to its axis, as indicated at 60. Outwardly of this inner end portion of the roller 43, the main body portion thereof is outwardly tapered, as indicated at 61. The outer end portion of the roller 43 is rounded as indicated at 62.

In Fig. 1 of the drawing, the improved tool A is shown as an attachment applied to the turret 12 with the axis of its stop 27 and shank 29 aligned with the axis of the collet 11.

A long bar stock X is shown in Fig. 1 extending endwise through the headstock 10 and the collet 11 and with the feed 14 holding the bar stock X with its outer end pressed against the stop 27. The bar stock X is held by the collet 11 for rotation therewith. Obviously, the rotation of the bar stock X, in turn, rotates the stop 27.

When adjusting the rollers 43 to receive the bar stock X, they are positioned with their surfaces 60 the exact distance from the center of the stop 27 as the radius of aid bar. In endwise moving the bar stock X to the stop 27, it freely passes the rounded ends 62 of the rollers 43 and engages the tapered surfaces 61 of said roller and is directed thereby onto the roller surfaces 60 and centers the bar stock X with the stop 27.

The cylindrical extension 47 on the rollers 43, that are journaled in the slides 42 with a smooth running fit, prevent the rollers 43 from being forced out of alignment with the projected axis of the stop 27 and its shank 29 by an impact on said rollers 43 by the bar stock X.

When necessary for some types of machines, a tapered shank for the head 21 may be substituted for the cylindrical shank 22 shown.

From the above description of my improved tool, it will be seen that after the stop 27 is once set for a section of a bar stock of a predetermined length to be cut therefrom and a second stop set for the compound 13 to position a cut-off tool held thereby to cut said section, the bar section may be completely machined not only at the end portion held by the chuck or collet, but at the end portion of said bar stock adjacent to the stop 27 and the rollers 43 before the respective section of the bar stock is cut off. It will be seen that after the stops are once set, a number of sections of the bar stock may be endwise positioned, machined and cut off without disturbing the original adjustment of the stops, thus saving a great deal of time, and doing more accurate work.

The drawings illustrate a commercial form of the invention, but it will be understood that the same is capable of certain modifications as to details of construction, arrangement and combination of parts within the scope of the invention herein claimed.

What I claim is:

1. A tool of the class described, a body member having a lateral extension spaced inwardly from the face of the body member, a bore extending into the body member and its extension, said body member and its extension having an internal annular stop flange extending into the bore at the outer end thereof, a head extending into the bore from the rear end thereof and engaging the flange as a stop, means securing the head in the bore, a shank on the head extending rearwardly therefrom, said head having therein a cylinder open at its outer end, a rotatable disk-like stop in said cylinder and extending outwardly through the passageway formed by the annular flange, a bead on the stop, engageable with the inner side of the flange as a stop, the disk-like stop having on its inner side a shank axially aligned therewith and extending axially in the cylinder, a radial ball bearing supporting the disk-like stop and its shank in the cylinder, and a thrust ball bearing between the shank on the disk-like stop and the head.

2. In a tool of the class described, a body member having a bore and an internal annular stop flange extending into the bore at its outer end, a head extending into the bore from its rear end and engaging the flange as a stop, means securing the head in the bore, said head having a rearwardly projecting shank and also having a cylinder, open at its outer end, a rotatable disk-like stop in said cylinder and extending outwardly through the passageway formed by the annular flange, a bead on the disk-like stop engageable with the inner side of the flange as a stop, the disk-like stop having on its inner side a shank axially aligned therewith, and extending axially in the cylinder, a radial ball bearing supporting the disk-like stop and its shank in the cylinder, and a thrust ball bearing between the shank on the disk-like stop and the head.

KARL FELLROTH.

REFERENCES CITED

The following references are of record in the file of this patent:

UNITED STATES PATENTS

| Number | Name | Date |
| --- | --- | --- |
| 1,608,669 | Prydz | Nov. 30, 1926 |
| 1,821,331 | Svenson | Sept. 1, 1931 |
| 2,065,083 | Lovely | Dec. 22, 1936 |
| 2,465,558 | Toth | Mar. 29, 1949 |